United States Patent [19]

Shaffer

[11] 3,894,961

[45] July 15, 1975

[54] METHOD OF MAKING A SOLUTION OF PHOSPHOR RAW MATERIAL FOR USE IN MANUFACTURING PHOSPHORS CONTAINING TIN AS AN ACTIVATOR

[75] Inventor: Francis Nathan Shaffer, Towanda, Pa.

[73] Assignee: GTE Sylvania Incorporated, Stamford, Conn.

[22] Filed: Aug. 12, 1974

[21] Appl. No.: 496,656

Related U.S. Application Data

[63] Continuation of Ser. No. 317,176, Dec. 21, 1972, abandoned.

[52] U.S. Cl. .......................................... 252/301.4 P
[51] Int. Cl. .............................................. C09k 1/36
[58] Field of Search .............. 252/301.4 P, 301.6 P; 423/311

[56] References Cited

UNITED STATES PATENTS 2,809,167   10/1957   McKeag ...................... 252/301.4 P
3,676,358   7/1972   Dale et al. .................... 252/301.4 P

OTHER PUBLICATIONS

Mellor "A Comprehensive Treatise on Inorganic and Theoretical Chemistry," Vol. VII, p. 331.

Primary Examiner—Jack Cooper
Attorney, Agent, or Firm—Norman J. O'Malley; Donald R. Castle; William H. McNeill

[57] ABSTRACT

Clear solutions of tin activated alkaline earth phosphate phosphors starting materials are prepared by first forming a solution of tin metal and phosphoric acid. This solution is added to a solution of the phosphor host raw materials.

4 Claims, No Drawings

METHOD OF MAKING A SOLUTION OF PHOSPHOR RAW MATERIAL FOR USE IN MANUFACTURING PHOSPHORS CONTAINING TIN AS AN ACTIVATOR

CROSS-REFERENCE TO RELATED APPLICATION

This application is a continuation of Ser. No. 317,176, filed Dec. 21, 1972, now abandoned and assigned to the assignee of the present application. Original assignment recorded Dec. 21, 1972, Frame 150, Reel 2922.

BACKGROUND OF THE INVENTION

This invention relates to phosphors and more particularly to methods of dissolving tin into raw material combination solutions that can be evaporated to dry starting materials which are then fired to produce stannous activated alkaline earth phosphate phosphors.

Tin activated alkaline earth orthophosphate phosphors have been known since at least 1952. Outstanding phosphors of this system which have received wide commercial usage include stannous activated strontium pyrophosphate, and stannous activated strontium orthophosphate stabilized to the beta structure.

Tin activated alkaline earth phosphate phosphors can be prepared by firing and then cooling (at conditions that render the tin to the divalent state) homogeneous mixtures of raw materials as solids such as tin oxide, tin dioxide, tin phosphate, diammonium phosphate, monoammonium phosphate, various alkaline earth phosphates, carbonates, oxides or nitrates etc., in the proper proportions to give the desired finally fired composition and structure.

Another method of preparing homogeneous phosphor starting materials is to prepare solutions thereof made up in the correct proportion and to evaporate the solution. Where a part or all of the starting materials are insoluble, a liquid suspension can be prepared which is then evaporated to form the dried starting materials.

The evaporation step can be carried out in a drying oven, evaporating kettle or the like, or by freeze drying, etc. Another means of conveniently and practically evaporating solutions or suspensions to a finely divided starting material is by atomized vaporization in a spray drier.

While the above methods of preparation have been used with varying degrees of success each has presented its own distinct problems. For example, when starting with a mixture of dry starting materials, the question of true homogeneity always occurs. Beginning with a true solution obviates the above problem; however, prior practices have had difficulty in gaining useable stannous solutions. Generally, a stannous oxide suspension was mixed with a solution of the other raw materials and this was spray dried. When such methods are used it becomes a problem of maintaining the SnO in suspension in the feed slurry to the spray drier and again the question of homogeneity is raised. Additionally, there is a tendency for the SnO to build up accumulations in the spray drier system. Further, another disadvantage of the SnO suspension is the abrasive effect of the solid particles and a consequent and undesirable contamination from the mainly stainless steel spray drier.

Accordingly, it would be desirable to find some manner of incorporating tin in a soluble form in the alkaline earth nitrate-phosphoric acid mixed solutions to produce a stable, clear solution at proper proportions which could be dried to starting materials. Commonly available tin chlorides are ruled out due to their corrosive effect on the stainless steel spray drier and consequent objectionable contamination. Most other soluble tin compounds decompose to insoluble tin dioxide on contact with water.

OBJECTS AND SUMMARY OF THE INVENTION

It is, therefore, an object of this invention to obviate the disadvantages of the prior art.

It is another object of the invention to reduce contamination of phosphor raw materials.

It is yet another object of the invention to provide a method for solubilizing tin to be used as an activator in a phosphor material.

These objects are accomplished in one aspect of the invention by the provision of a method of making a solution of phosphor raw materials for use in manufacturing phosphors containing tin as an activator. The method comprises first forming a solution of the phosphor host in water and then forming a solution containing tin. The tin solution is formed by adding to a container of phosphoric acid a given quantity of −20 mesh tin metal. This is agitated with a magnetic stirrer while the temperature is raised to about 160°C. The temperature increase should take about one-half hour at which time all of the tin is in solution. The tin containing solution is then cooled to about 30°C and it is then mixed, with agitation, with the phosphor host containing solution. After mixing, the materials are ready for drying by one of procedures described above, and then the phosphor is formed by conventional techniques.

Use of the above-described method insures homogeneity and eliminates the possibility of contamination due to abrasion when spray drying equipment is employed.

DESCRIPTION OF THE PREFERRED EMBODIMENT

For a better understanding of the present invention, together with other and further objects, advantages and capabilities thereof, reference is made to the following disclosure and appended claims.

It has been reported that tin can be solubilized in a solution of meta-phosphoric acid (Page 331 of Volume VII of "A Comprehensive Treatise on Inorganic and Theoretical Chemistry;" J. W. Mellor, D. Sc).

In accordance with this invention, it has been discovered that by placing in a clean container a desired amount of orthophosphoric acid in such a manner that it could be heated while maintaining agitation and adding thereto a suitable amount of fine grain −20 mesh tin metal substituted for the tin oxide ordinarily employed, the ortho-phosphoric acid gradually dehydrated to near meta-phosphoric acid during the heating and stirring. The tin metal gradually dissolved and the solution thickened from a water-like to a syrup-like consistency. After determining that all of the tin is dissolved, the solution is cooled to near room temperature, about 30°C.

When a properly proportioned tin solution has been made as above, it is blended into another solution containing properly proportioned dissolved strontium, magnesium and calcium nitrate in water, for example. The blended solutions remain water clear for up to several days.

As an example of one type of phosphor which has been made by this method the following is submitted:

EXAMPLE I

A first solution is prepared by dissolving in about 800 ml of hot deionized water with agitation about 538g $Sr(NO_3)_2$, 70.5g $Mg(NO_3)_2 \cdot 6H_2O$ and 17.7g $Ca(NO_3)_2 \cdot 4H_2O$. When all ingredients are in solution total volume is diluted to about 1,400 ml with cold deionized water and the solution is cooled to about 30°C.

A second solution is then prepared by weighing into a clean vessel about 230g phosphoric acid, ortho (85%) and 4.75g fine grain −20 mesh tin metal. Agitation is set up with a magnetic stirrer while the temperature is raised (as by placing the vessel on a hot plate) to about 160°C in one-half hour. During the heating and stirring all of the tin will go into solution and the volume will shrink from about 180 ml to about 140 ml. The solution is then cooled to about 30°C.

With both solutions prepared, they are blended together, with agitation, and are now ready for any of the previously described drying processes.

As a test of the process, at intervals over a period of several days, portions of clear solutions made as above were dried to a finely divided, white body colored powder by atomized vaporization in a spray drier. The spray dried material was then given a heat treatment in open silica boats for about 1 hour at about 1,100°C in air to drive off about 40 weight per cent volatiles and initiate to some extent a reaction of the component ingredients. The material was then cooled to room temperature and then given a further heat treatment to render it luminescent. This latter heat treatment occurs in open silica boats at a temperature of about 1,165°C for about 3½ hours in an atmosphere of nitrogen diluted with about 1% hydrogen. It is then cooled to near room temperature in a slightly reducing nitrogen-hydrogen atmosphere before removing from the furnace, to prevent oxidation of the stannous activator.

Phosphor samples prepared as above from starting materials made from spray dried clear solutions gave equivalent performance in 40 watt lamps to phosphors made by the older methods wherein the activator solution was in reality a suspension of tin oxide.

Use of the above-described invention insures homogeneity of feed solutions, eliminates the tendency toward a build-up of SnO in a spray drier and eliminates contamination from the abrasive effects of SnO in suspension.

Further, the invention is applicable to the preparation of any clear phosphate phosphor starting material solutions where the activator is tin and the cation is acid soluble.

While there have been shown and described what are at present considered to be the preferred embodiments of the invention, it will be apparent to those skilled in the art that various changes and modifications can be made therein without departing from the scope of the invention as defined by the appended claims.

What is claimed is:

1. In a method of making a solution of phosphor raw materials for use in manufacturing phosphors comprised of an alkaline earth phosphate host containing tin as an activator the steps comprising: forming a first aqueous solution of alkaline earth metal ions in amounts sufficient to form said phosphor host; forming a second solution containing said tin by the steps comprising: adding to a container of phosphoric acid a given amount of −20 mesh tin metal; agitating with a magnetic stirrer while raising the temperature to about 160°C in about one-half hour until all of the tin is in solution; cooling said second solution to about 30°C; and adding said second solution to said first solution with agitation.

2. The method of claim 1 wherein 4.75g of said tin is dissolved in 230g of phosphoric acid which is about 85% ortho.

3. The method of claim 2 wherein said first solution includes Sr; Mg; and Ca.

4. The method of claim 3 wherein said first solution is prepared by adding to 800 ml of hot deionized water, under agitation, 538g $Sr(NO_3)_2$; 70.5g $Mg(NO_3)_2 \cdot 6H_2O$; and 17.7g $Ca(NO_3)_2 \cdot 4H_2O$; agitating until a solution is formed; adding cooled deionized water to dilute to 1,400 ml and cooling to about 30°C.

* * * * *